United States Patent [19]

Yamada

[11] Patent Number: 4,817,087
[45] Date of Patent: Mar. 28, 1989

[54] MULTIPLE ACCESS COMMUNICATION SYSTEM

[75] Inventor: Kunihiro Yamada, Tokyo, Japan

[73] Assignee: Ricoh Company, Ltd., Tokyo, Japan

[21] Appl. No.: 930,450

[22] Filed: Nov. 14, 1986

[30] Foreign Application Priority Data

Nov. 20, 1985 [JP] Japan ................. 60-260753

[51] Int. Cl.⁴ ............................................. H04J 3/02
[52] U.S. Cl. ............................................ 370/85; 370/94
[58] Field of Search ............. 370/85, 94, 110.1, 94 U, 370/29, 69.1, 124, 88; 340/825.5

[56] References Cited

U.S. PATENT DOCUMENTS

| | | | |
|---|---|---|---|
| 4,242,249 | 12/1980 | Takezoe | 370/85 |
| 4,511,958 | 4/1985 | Funk | 370/85 |
| 4,626,843 | 12/1986 | Szeto et al. | 340/825.5 |
| 4,631,534 | 12/1986 | Franklin et al. | 370/85 |
| 4,707,828 | 11/1987 | Yamada | 370/85 |

Primary Examiner—Robert L. Griffin
Assistant Examiner—Frank M. Scutch, III
Attorney, Agent, or Firm—Oblon, Fisher, Spivak, McClelland & Maier

[57] ABSTRACT

A multiple access communication system with a multichannel construction and applicable to a local area network (LAN). In a broadband LAN, channel assignment is agreed upon by two nodes which are to hold a communication therebetween so that a channel assigned may be continuously occupied by those nodes. The system makes it possible to perform channel assignment and channel interchange which are based on fully decentralized control. In addition, the system accommodates communications on those traffics which are entirely different in nature from each other, e.g. those in which analog and digital informations are mixed together.

18 Claims, 3 Drawing Sheets

MULTIPLE ACCESS COMMUNICATION SYSTEM

BACKGROUND OF THE INVENTION

The present invention relates to an access system for a local area network (LAN) and, more particularly, to a multi-channel multiple access communication system.

In a LAN, the transfer of video data, audio signals and other continuous data have customarily been implemented with a central control type channel switching system. The central control type channel switching system is such that a central control device scans nodes of the network by polling to check channel assignment and connection requests. A decisive factor in the channel assignment which relies on such a central control is the reliability of the central control device; once it fails, the whole system fails. Further, because one central control device is required with no regard to the number of nodes which belong to the network, the system construction becomes disproportionately complicated when the number of nodes is relatively small. In addition, the communication efficiency, especially communication time, is limited by that of the central control device so that the system efficiency is sharply lowered as the number of nodes is increased.

SUMMARY OF THE INVENTION

It is therefore an object of the present invention to provide a decentralized control type multiple access communication system which in a broadband LAN allows any two nodes which hold a communication therebetween to fix channel assignment by themselves and occupy the assigned channel continuously.

It is another object of the present invention to provide a generally improved multiple access communication system.

A multiple access communication system in which a plurality of nodes interconnected to a common transmission path which is in a multi-channel construction interchange information with each other of the present invention comprises a first exclusive transceiver for a control channel which is assigned commonly to the nodes such that the transceiver becomes ready to receive either constantly or when a link is not set up between the nodes, and at least one second exclusive transceiver for transferring information over at least one of a plurality of transfer channels which are used for the transfer of information. Information is interchanged between the nodes such that at least one of the nodes which are to hold a communication therebetween searches for and selects an idle channel out of the transfer channels. A packet interchange is effected beforehand via the first transceiver between the nodes which are to hold a communication therebetween. During the packet exchange, at least one of the nodes delivers a control packet and, at the same time, begins to deliver a carrier to the idle channel. A channel for information transfer is assigned by the packet interchange. Information is transferred to the other node via the second transceiver which is turned to the channel assigned.

In accordance with the present invention, a multiple access communication system with a multi-channel construction and applicable to a local area network (LAN) is disclosed. In a broadband LAN, channel assignment is agreed upon by two nodes which are to hold a communication therebetween so that a channel assigned may be continuously occupied by those nodes. The system makes it possible to perform channel assignment and channel interchange which are based on fully decentralized control. In addition, the system accommodates communications on those traffics which are entirely different in nature from each other, e.g. those in which analog and digital informations are mixed together.

The above and other objects, features and advantages of the present invention will become more apparent from the following detailed description taken with the accompanying drawings.

DESCRIPTION OF THE PREFERRED EMBODIMENTS

Figure 1:
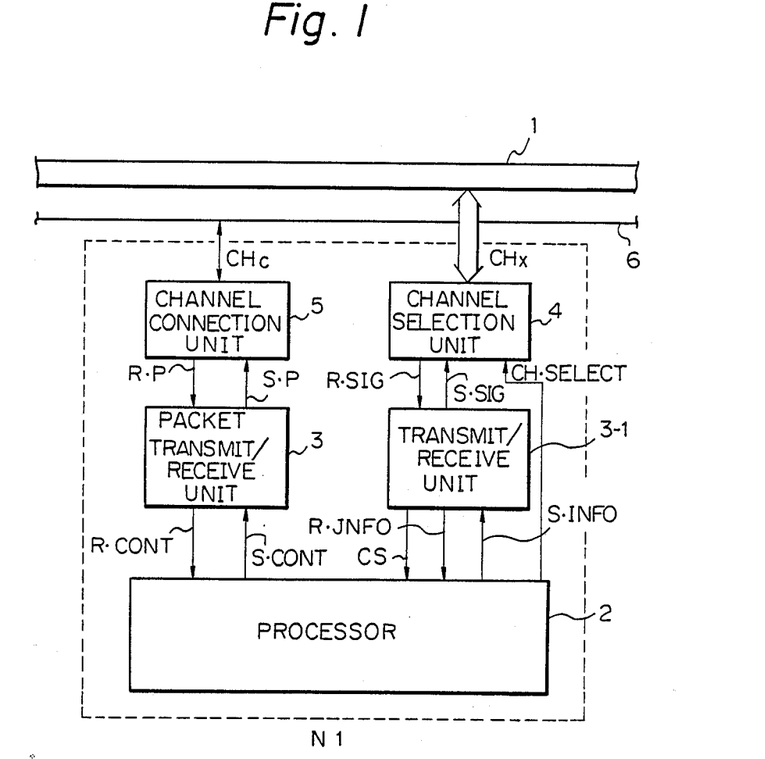
FIG. 1 is a block diagram showing a specific construction of a node connected to a LAN with which the multiple access communication system of the present invention is practiced.

Referring to FIG. 1 of the drawings, there is shown a node N1 for practicing the multiple access communication system of the present invention. A common transmission path 1 is made up of a plurality of channels and may be implemented with a baseband transmission path or a broadband transmission path. As well known in the art, the baseband transmission path allows transmission channels CHx to be selected by use of a plurality of cables while the broadband transmission path allows transmission channels CHx to be selected by use of a single cable and by changing the frequency of a carrier. The node N1 is capable of interchanging information with another node over any of those transmission channels. It is to be noted that the word "information" mentioned above refers to data other than control data which are associated with channel assignment, which will be described. In practice, the data other than control data include computer data, audio data, and video data. Let the channel used for the transfer of information be called a "transfer channel". Further, the words "control data" are assumed to represent those data which are related to channel assignment unless otherwise noted. A cable 6 is adapted to transmit control data and, in this sense, it is called a "control channel CHc" hereinafter. Thus, each of a plurality of nodes N (only N1 is shown) is capable of gaining access to one control channel CHc and a plurality of transfer channels CHx.

The gist of the present invention lies in taking advantage of the fact that the number of nodes which can gain access to the control channel CHc at any time point is only one. Specifically, based on the fact that only one node can have access to the control channel CHc although a plurality of nodes may try to do so at the same time, the present invention allows only one node to make a declaration of use (assignment) of a transfer channel at a time.

The access to the cable 6, or control channel CHc, as shown in FIG. 1 will be described in relation to a carrier sense multiple access with collision detection (CSMA/CD) system such as ETHERNET which is well known in the art. Assume that the X-th transfer channel CHx corresponds to the X-th cable (CBx) of a coaxial cable or a twisted pair. Information S-INFO to be sent is coded or modulated adequately by a transmit section of a transmit/receive unit 3-1 to become a transmit signal S-SIG. The transmit signal is fed by a channel selection unit 4 to one of the transfer channels CHx (number X), i.e., cable CBx as designated by a signal CH.SELECT, which will be described. Meanwhile, a signal R-SIG received over a transfer channel CHx which is designated by the signal CH.SELECT is selected by the channel selection unit 4 and, then, decoded or demodulated by a receive section of the transmit/receive unit 3-1 to become received information R-INFO. While in the specific construction of FIG. 1 the informations S-INFO and R-INFO are produced from and entered into a processor 2, they may alternatively be directly interconnected to a digital telephone, facsimile or like subsystem.

In the case where a communication in only one direction (transmission or reception) is allowed on an assigned channel CHx, transmission cannot be effected during the course of reception within the same node. In accordance with the present invention, transmission and reception can be effected at the same time by causing the signal CH.SELECT to designate two channel numbers X and X'. In such a case, while two channels CHx and CH'x are used at the same time, let the channel CH'x, too, be represented by CHx unless otherwise noted.

Assume a case wherein the node N1 transmits a great amount of information to a node N2, not shown. First, the processor 2 of the node N1 applies the signal CH.SELECT to the channel selection unit 4 to select a channel CHx. Then, the transmit/receive unit 3-1 determines whether or not a received signal R-SIG, or carrier, is present on the selected channel CHx and delivers a carrier sense signal SC to the processor 2. If the signal CS does not indicate the presence of a received signal R-SIG, i.e., if no signal is present on the channel CHx, the processor 2 decides that the channel CHx is idle. If the channel CHx is not idle, then the processor 2 designates another channel by the signal CH.SELECT. The processor 2 designates an idle channel which will in due course be found by the repetition of the above procedure as an information transfer channel CHx.

The processor 2 hands over the number X of the idle channel CHx searched and selected as stated above, channel assignment control data and a destination's address (address of the node N2) to a packet transmit/receive unit 3 as a transmission control signal S-CONT. The unit 3 and a channel connection unit 5 serve to send the control signal S-CONT to the cable 6, or control channel CHc. Specifically, determining that a carrier is absent on the control channel CHc, the packet transmit/receive unit 3 begins to deliver to the cable 6 via the channel connection unit 5 a packet which consists of control data and others as mentioned above. Substantially simultaneously with the start of delivery of the packet, the unit 3 sends a command to the transmit/receive unit 3-1 so that the unit 3-1 begins to deliver a carrier to the channel CHx which has been selected.

It is to be noted that a command signal line extends from the packet transmit/receive unit 3 to the transmit/receive unit 3-1 for the delivery of a carrier to the channel CHx, although not shown in FIG. 1. Another possible arrangement is such that the packet transmit/receive unit 3 informs the processor 2 of the start of delivery of the control packet to the channel CHc and, in response, the processor 2 sends a carrier delivery command to the transmit/receive unit 3-1. As the channel connection unit 5 detects a collision of the control packet with a packet from another node during the course of transmission of the control packet, it applies a collision detection signal to the packet transmit/receive unit 3 which then interrupts the transmission of the control packet and, instead, causes the unit 5 to send a suitable jam signal to the cable 6. Simultaneously, the unit 3 commands the transmit/receive unit 3-1 an interruption of the deliver of the carrier to the channel CHx.

As previously stated, the gist of the present invention resides in taking advantage of the fact that any of a number of nodes gains access to the control channel CHc exclusively. Only that node which has successfully sent a control packet without a collision is allowed to send a carrier to the selected channel CHx after the control packet. When two or more nodes have selected the same channel CHx to start delivering carriers to the channel CHx simultaneously with the delivery of control packets, the collision of the control pacekts is detected so that each of the nodes in conflict interrupts the delivery of carrier to the channel CHx; the channel CHx is not assigned to any of the nodes. In this condition, according to a back-off procedure, an ordinary procedure of a CSMA/CD system, another attempt to deliver a carrier to the channel CHx and a control packet will be made.

When a node other than the node N1 has acquired the right to use the control channel CHc (referred to as media acquisition) before the node N1, it is possible for that node to assign the channel CHx to itself. Then, the node N1 in a standby state sees that the channel CHx has been occupied since a carrier appears on the channel CHx. In that case, the node N1 cancels a control packet transmission command and performs the procedure again starting with the search for an idle channel. The media acquisition by any node other than the node N1 occurs not only when the node N1 is in a back-off state but also when a node other than the node N1 starts sending a control packet just before the node N1 does.

As the node N2 receives a control packet which the node N1 has sent (assuming that the destination's address is that of the node N2), it sees that information will be sent over the channel CHx from the node N1. The node N2 picks up an R-P signal from the cable 6 by means of the channel connection unit 5 and causes the packet transmit/receive unit 3 to hand over the control data received to the processor 2. Subsequently, the processor 2 of the node N2 commands the channel selection unit 4 selection of the channel CHx by means of CH.SELECT. As the channel CHx is selected, a signal is propagated through the common transmission path 1 to the transmit-receive unit 3-1 via the channel CHx, channel selection unit 4 and R-SIG and, therefrom, to the processor 2 via R-SIG, whereby the information from the processor 2 of the node N1 is transferred to that of the node N2. Let the information transfer channel set up from the node N1 to the node N2 as stated above be called a "forward transfer channel." By the procedure described so far, the channel CHx for setting up a link between the nodes N1 and N2 is assigned by the node N1, allowing information to be transferred from the node N1 to the node N2.

In this particular embodiment, even though the node N1 may assign the channel CHx to itself, the node N2 cannot receive information from the node N1 unless it is prepared for reception; one-sided transfer of information from the node N1 to the node 2 would be wasteful.

Nevertheless, this situation can be settled with ease and by the following exemplary implementations.

A first possible implementation is causing the node N1 to inquire the node N2 over the control channel CHc before assigning the channel CHx to itself. The inquiry data is short enough to avoid an increase in the load on the control channel. If the result of inquiry shows that the node N2 is in a ready state, the node N1 performs the sequence of operations for the channel assignment as previously stated.

A second implementation is such that after the node N1 has assigned the channel CHx, the node N2 sends back an acknowledge packet to the node 1. Specifically, when the node N1 has received an acknowledge packet within a predetermined period of time after the assignment of the channel CHx, it starts the transfer of information over the channel CHx. When the node N1 has not received an acknowledge packet within that period of time (Time Out) or when it has received a negative acknowledge packet, the node N1 gives up the channel CHx assigned, i.e., it stops the delivery of a carrier to the channel CHx determining that the delivery of information to the node N2 is impossible.

The manner of information interchange, signal format and others on the information transfer channel between the nodes N1 and N2 are open to choice. Specifically, whether or not information is in a packet configuration is not decisive, and any desired data rate may be selected. Even the modulation system is free to choose if the common transmission path 1 is coaxial (see FIG. 2) as in a broadband system, typical examples being FSK, PSK and ASK systems. Furthermore, video, audio and other analog signals may be modulated and transferred in their analog forms if they keep themselves within the frequency band of a channel assigned. The prerequisites are that the channel CHx selected be prevented from interfering with other channels, and that even the other nodes be capable of surely detecting a carrier.

The freedom extends itself even to the manner of use of the channel CHx assigned. Because the nodes N1 and N2 can occupy the channel CHx so long as the other nodes do not decide that the carrier on the channel CHx has disappeared, the direction of information transfer between the nodes N1 and N2 may be changed. Specifically, only if the carrier on the channel CHx is prevented from being interrupted, the direction of information transfer from N1 to N2 and from N2 to N1 may be reversed. Furthermore, because the change of direction from N1 to N2 is possible, bidirectional information transfer based on so-called semiduplex operations may be effected.

To change the direction of transfer without interrupting a carrier on the channel CHx, an arrangement may be made such that when a carrier being sent from one of two nodes has been interrupted even for a moment, the other node immediately starts sending a carrier to the one node over the channel CHx. During the carrier sense operation which is performed to find an idle channel, an instantaneous or temporary carrier-off is treated as a momentary interruption and neglected. The carrier-off time should be a predetermined time which is equal to or somewhat longer than the maximum reciprocal propagation delay time particular to a network.

A second approach to prevent the carrier from being interrupted is causing one of two nodes to start sending a carrier over the channel CHx just before a carrier being sent from the other node is interrupted. In accordance with this scheme, the carrier from the own node and the carrier from the other node overlap each other so that the interruption of a carrier on the channel CHx is eliminated. The time when the carrier from the other node is to be interrupted may be estimated by inserting timing control data in the information on the channel CHx or may be known through the control channel CHx.

A third approach pertains to a broadband system by way of example. Specifically, the third approach is such that at the instant when a carrier being sent from the other node over the channel CHx disappears at the head end, a carrier to the other node starts appearing on the channel CHx. As regards the down-going channel CHx, neither overlapping nor interruption occurs.

As seen from the description made so far, the access system to the control channel CHc may be of any desired type insofar as nodes which hold a communication therebetween use a channel exclusively. The CSMA/CD system, among others, is desirable since it is capable of detecting simultaneous use of a channel by another node. Even a simple CSMA system without a CD (collision detection) function is able to detect a collision by seeing whether an acknowledgement has been received from the other node, but it is disadvantageous in that a substantial period of time is needed for Time Out which degrades the peformance (a carrier has to be continuously delivered to the channel CHx until a collision has been found). On the other hand, a CSMA system with an immediate acknowledgment function involves a minimum of waste since the required Time Out time is minimum. Another advantage of the CSMA system with an immediate acknowledgment over the simple CSMA/CD is that conditions of the other node can be inserted in a response. This means that in certain cases not an acknowledge but a negative acknowledge may chance to appear. So far as the CSMA system with an immediate acknowledgment function is concerned, although a CD function is absent, the performance is not lowered when the packet length is relatively short, compared to the system with a CD function.

A system which relies on token passing is an exclusive access system which is desirably applicable to the present invention. Concerning a token system, a token bus as stated in IEEE-802. 4 and a token ring as stated in IEEE-802. 5 are well known in the art. All these systems are suitable for the present invention since when a token system is applied to the control channel CHc it is only one node that can use the channel at a time. In relation to a token system, it is known that priority can be given with ease by changing the manner of passing a token round from one node to another. So far as a CSMA/CD system is concerned, priority may be given by changing the length of a preaamble; the longer the preamble, the higher the priority order is.

Be setting up priority with respect to the access to the control channel, it is possible to give priority to the assignment of a transfer channel. In accordance with the present invention, because a transfer channel can be assigned only when a channel assignment control packet has been successfully delivered on the control channel, priority given to the delivery of control packets is directly reflected on the assignment of a transfer channel. It is sometimes necessary for priority to be given to information transfer in terms of the kind of data communication (referred to as a service class in a general sense). In accordance with the present invention, because information is transferred between two nodes over an exclusive transfer channel, setting up priority in transfer channel assignment, i.e., in the delivery of channel assignment control packets provides the transfer of information with priority automatically. It follows that when control packets are sent according to the priority which is based on service classes, information will be transferred according to the same priority.

Another approach which is as effective as the priority scheme using service classes is grouping channels on the basis of service class and allowing an access to only a particular channel group which is associated with a particular service class. For example, when the channels are divided into two different channel groups one of which is greater in the need for real-time communication than the other, the former group is prevented from being effected by the latter group. Another advantage is that the priority band width, data rate, transmission system, code system, modulation system and others may be different from one channel group to another. For example, one channel group may transfer data at a rate of 1 Mbps and another group at a rate of 10 Kbps, while still another group may transfer speeches by an analog signal and a farther group a video signal (ordinary television signal).

How the present invention is used at the application level will be described in relation to a practical example.

Assume facsimile communications first. When a picture is to be sent from the node N1 to the node N2, the node N1 inquires the node 2 its state. If the node N2 is ready, the node N1 sends a channel assignment control packet to the node N2 over the control channel CHc and, at the same time, starts delivering a carrier to an idle channel CHx which has been found and selected beforehand. If the transmission of the control packet is successful, the assignment of a transfer channel is regarded as being successful. It is to be noted that the success of the transmission of a control packet is represented by, for example, the absence of a collision or the return of an acknowledgement or, in the case of a token system, the reception of a token. Upon the success of the transfer channel assignment, picture data are transmitted over the channel CHx. After the transmission of the picture data, the carrier on the channel CHx may be interrupted to make the channel CHx idle. Alternatively, the node N1 may cause the node N2 to return a result of reception over the control channel CHc so as to make the channel CHx idle after confirming perfect reception of the picture data by the node N2. In the example described, the node N1 is triggered to send picture data to the node N2. Next, assume a case wherein the node N1 is triggered to receive picture data from the node N2. After the transfer channel assignment has succeeded by the previously described procedure (at this instant, the direction of transfer is from N1 to N2), the direction of transfer is changed to from N2 to N1. Then, picture data are sent from the node N2 to the node N1, followed by making the channel CHx idle.

In the examples described above, because it is the node N1 that assigns a transfer channel, the direction of transfer is switched in order to allow the node N2 to transfer picture data when required. A method which eliminates the need for such a switching operation is as follows. Specifically, in accordance with the alternative method, the assignment of a transfer channel is performed by the node N2 and not by the node N1. In this condition, the node N1 sends a channel request packet to the node N2 over the control channel CHc in order to request the assignment of a transfer channel. It will be apparent that the channel request packet may be accompanied by extra information representative of which data is required. Upon reception of the channel request packet, the node N2 checks an idle channel CHx which it has searched and selected beforehand to see if it is still idle and, if it is idle, sends a transfer channel assignment packet to the node N1 over the channel CHc and, at the same time, begins to send a carrier is successful, the node N2 transmits picture data to the node N1 over the channel CHx. After the transfer of the picture data, the node N2 makes the channel CHx idle as previously stated. Such a method is advantageous in the following respects. Generally, an acknowledgment is sent between nodes in order to guarantee the transfer of control data and others between nodes. Although the acknowledgment in such a ordinary system may be omitted if the reliability of transfer is very high at the physical level, the method in accordance with the present invention as described above is capable of omitting one acknowledgment otherwise returned in response to a channel request packet. In addition, because the alternative method eliminates the need for channel switching as stated before, the period of time during which the control channel and a transfer channel are occupied is shortened to enhance the efficiency of the network as a whole.

In the example discussed above which pertains to facsimile communications, the channel CHx may be made idle after the transfer of one page of picture data and, when a plurality of pages of picture data are to be transferred, the carrier on the channel CHx may be continuously sent until the end of transfer of all the pages. Moreover, when it is desired to reverse the direction of transfer of picture data, the direction can be changed. In short, the path between the nodes N1 and N2 may be used without interruption insofar as the carrier on the channel CHx is not interrupted.

Hereinafter will be described a case wherein bidirectional and simultaneous transfer of information is needed over a telephone line which allows two parties to hold a conversation at the same time.

One method to meet the above requirement is assigning a forward transfer channel from the node N1 to the node N2 and a reverse transfer channel from the node N2 to the node N1 by effecting twice the previously described packet interchange for the channel assignment.

Another method begins with, if the channel CHx is idle, causing the node N1 to send a channel assign packet to the node N2 and to start the delivery of a carrier to the channel CHx. Upon reception of the channel assign packet, the node N2 determines whether an idle channel CH'x searched and selected beforehand is still idle and, if it is idle, delivers a channel assign packet to the node N1 and, at the same time, starts delivering a carrier to the channel CH'x. As a result, the forward transfer channel from the node N1 to the node N2 and the reverse transfer channel from the node N2 to the node N1 are assigned on CHx and CH'x, respectively. This sets up a full-duplex communication link between the nodes N1 and N2.

Still another method also begins with, if the channel CHx is idle, causing the node N1 to send a channel assign packet to the node N2 and to start delivering a carrier to the channel CHx. In response to the packet, the node N2 delivers a carrier toward the node N1 over a reverse channel CH'x which is associated with the channel CHx and agreed upon by the whole network beforehand. In this instant, carrier sense is not applied to the reverse channel CH'x as also agreed upon by the whole network. That is, if a forward channel is idle, a reverse channel is made idle without exception. Consequently, the channels CHx and CH'x, i.e., bidirectional transfer channels are assigned by one channel assignment between the nodes N1 and N2. It will be apparent to those skilled in the art that this kind of full-duplex link is applicable to a system in which the node N1 sends a channel request packet to the node N2 which then assigns channels. Assume that the channel from the node N2 to the node N1 and the channel from the node N1 to the node N2 each assigned by the node N2 are CHx and CH'x, respectively, and let these channels CHx and CH'x be called a forward and a reverse channels, respectively. Then, the above-stated principle, i.e., making a reverse channel idle without exception if a forward channel is idle is directly applicable.

Figure 2:
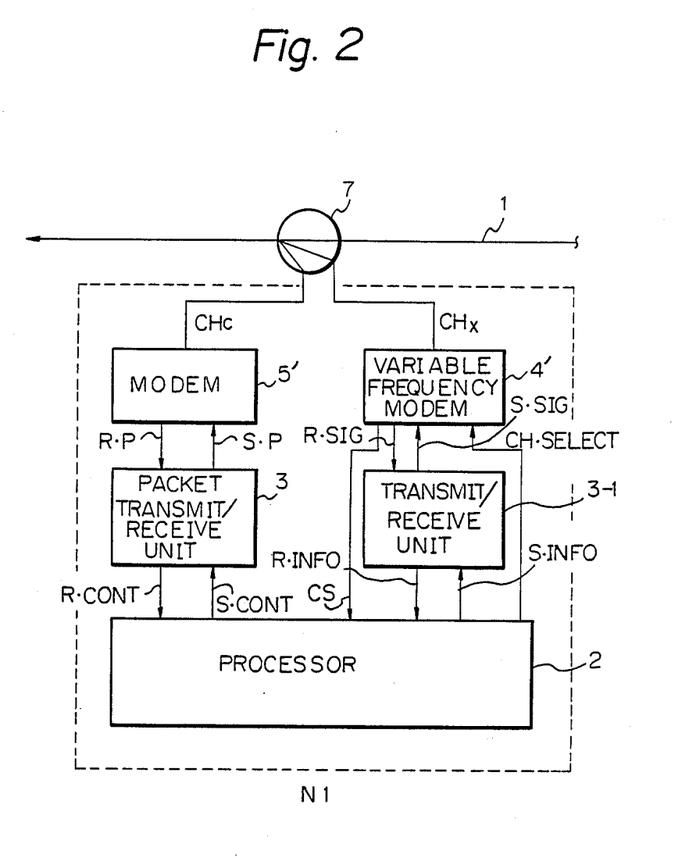
FIG. 2 is a block diagram showing another specific construction of the node.

FIG. 2 shows an example in which the present invention is applied to a broadband system which is particularly suitable for a multi-channel arrangement of the kind using frequency multiplexing. In FIG. 2, the control channel CHc is a certain fixed channel while the transfer channel CHx is one of a plurality of channels which is selected by a variable frequency MODEM 4'. In the broadband system, the channels CHc and CHx can be accommodated on a single cable at the same time. Because the system of FIG. 2 is a single cable system, an up-going signal directed toward the head end is subjected to frequency conversion at the head end and, then, propagated in the down-going direction through the same cable. Thus, it should be born in mind that the channels CHc and CHx are logical channels, i.e., the frequency differs from transmission to reception. In the case of a dual cable system such as WANG-NET, although two cables have to be assigned one to the up-going direction and the other to the down-going direction, transmission and reception share the same frequency since frequency conversion is needless, although not shown in the drawings. In FIG. 2, the reference numeral 7 designates a directional coupler, and 5' a MODEM.

Figure 3:
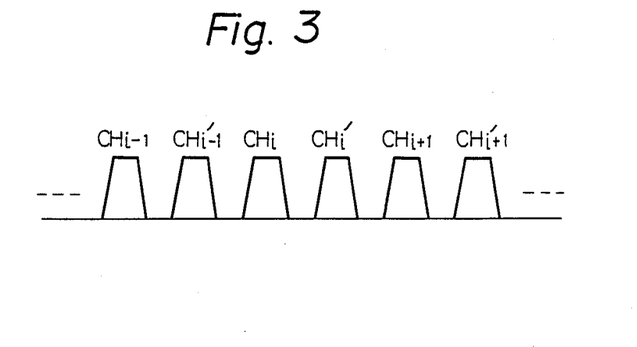
FIG. 3 is a diagram representative of frequency assignment on forward and reverse channels.

Forward channels (..., $CH_{i-1}$, $CH_i$, $CH_{i+1}$, ...) and reverse channels (..., $CH'_{i-1}$, $CH'_i$, $CH'_{i+1}$, ...) may be assigned as shown in FIG. 3 in terms of frequency. One of various merits of such a frequency arrangement is that the nearby channels $CH_i$ and $CH'_i$ are available for those nodes which do not need bidirectional simultaneous transfer but require a broader frequency band. The simultaneous use of the channels $CH_i$ and $CH'_i$ is capable of coexisting with the system which sets up a one-directional communication link since, in a system which sets up a full-duplex link by using the channels $CH_i$ and $CH'_i$, the channel $CH'_i$ is made idle when the channel CH is idle.

The system described above may be modified as follows. When a link is to be set up in one direction only, neither the channel $CH_i$ or the channel $CH'_i$ is used. When a link is to be set up in two directions, the channels $CH_i$ and $CH'_i$ (or $CH'_i$ and $CH_i$) are used as a forward and a reverse channels, respectively. A prerequisite is that in the case of the bidirectional link arrangement carrier sense is effected on the channels $CH_i$ and $CH'_i$ at the same time in order to confirm that both of the channels $CH_i$ and $CH'_i$ are idle at the same time. In a broadband system, it is possible to detect that both of the two channels are idle by effecting carrier sense over a frequency band which contains the band of the nearby two channels. This method not only allows a full-duplex link and a semi-duplex link to coexist but also makes it possible to use both of a forward (reverse) and a reverse (forward) transfer channels is a full-duplex link, thereby enhancing effective use of channels.

Figure 4:
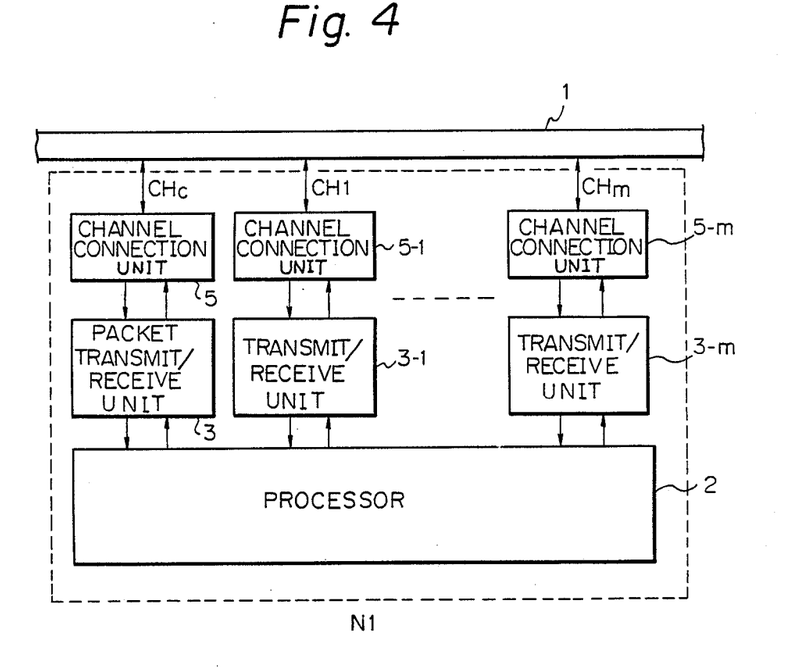
FIG. 4 is ia block diagram showing a farther specific construction of the node.

As regards a full-duplex link, the forward channels CHx and the reverse channel CH'x use frequencies which are different from each other and, in this sense, it may appear that each node requires two independent transceivers for the transfer of information. However, even only one transceiver suffices since one of the channels CHx and CH'x is adapted for transmission and the other for reception, i.e., one transmitter and one receiver suffice. Naturally, the transmitter and the receiver gain access to different channels from each other. Furthermore, when the node N2 has received a channel assign packet from the node N1, it is needless for the node N2 to receive CHx immediately and, therefore, a receiver may be used for a carrier sensing purpose on CH'x just before the node N2 sends a carrier over CH'x. The receiver at the node N2 may be conditioned for CHx after the success of assignment of CH'x. Again such can be implemented with a single transceiver, Installing a plurality of channel connection units and a plurality of transit/receive units as shown in FIG. 4 is advantageous in another respect. Specifically, a plurality of receivers speed up the search for an idle channel. Another advantage is that links can be set up between a node and other different nodes.

In accordance with the present invention, when the carrier on the transfer channel is shut off, that channel becomes idle immediately (after a period of time which is at least long enough for all the nodes to recognize the interruption of the carrier). Where a CSMA/CD system is applied to the control channel, the CD function allows the right to use the control channel to be acquired (only by the node) substantially without fail. Hence, a transmit node can assign a transfer channel for itself (even if a receive node is busy) substantially without fail. It, therefore, does not always occur that when a transmit node has assigned a transfer channel one-sidedly and transferred information to a receive node, the receive node is sure to receive it. Besides, there is a chance, although rare, for two nodes to assign the same transfer channel at the same time due to a failure of the CD function. Generally, this kind of unusual condition is detected based on the fact that the receive node does not send back a normal resposne. When informed of the unusual condition, a node which is delivering a carrier to a transfer channel shuts off the carrier one-sidedly to make the transfer channel idle and devolve the right to access upon another node. This is, at the instant when a mode which is in an information transfer mode (assigned with channel) has detected an unusual condition on a transfer channel, the right to gain access to that channel can be devolved by cancelling the information transfer mode.

An advantageous expedient to cancel not only the transfer mode of the own station but also that of the other station when an abnormal condition is detected is causing a transfer mode cancel packet to be sent over a control channel. Such is effective to make the transfer channel, which is sent from the other party, idle at an earlier timing (in the case of full-duplex link).

It sometimes occurs that an abnormal condition is detected by a receive node while only a transfer channel of one direction is being used (inclusive of semi-duplex operation). For example, when information received includes an error (as in the case of CRC), when the level of a received signal is unusual, when synchronization is not successful, or when a coding rule is violated, all that is required is causing the receive node to send a transfer mode cancel packet to the transmit mode so as to force it to give up the transfer channel. Not only in a normal condition but also in an abnormal condition, a transfer channel should be made idle as soon as possible after the completion of a communication. A node which recognized the end of a communication is capable of immediately giving up a transfer channel (if any) which it has sent. Also, it sends a link cut-off packet to the other node to command cut-off of the link, thereby cancelling the transfer mode.

In a full-duplex link, a node which has detected the end of a communication or an unusual condition cancels the transfer mode of the link in use immediately, i.e., it gives up a transfer channel being sent. The cut-off of the link, i.e., that fact that the transfer channel being received has become idle notifies the other node of the end of a communication or of the unusual condition, the node then cancelling the transfer mode of the link in use. In this manner, a transfer mode on a link between two nodes is cancelled.

In summary, it will be seen that the present invention provides a multiple access communication system which in a broadband LAN causes channel assignment to be arranged between two communicant nodes and, in the event of allowing the channel assigned to be continuously occupied by the two nodes, promotes channel assignment and channel interchange by fully decentralized control and, in addition, facilitates communications by traffics which are entirely different in nature, e.g. those in which analog and digital data are mixed together.

Various modifications will become possible for those skilled in the art after receiving the teachings of the present disclosure without departing from the scope thereof.

What is claimed is:

1. A multiple access communication system in which a plurality of nodes are interconnected by a common transmission path said common transmission path having a plurality of channels, and said nodes interchange information with each other, comprising:
   a first exclusive transceiver for a control channel which is assigned commonly to said nodes such that said transceiver becomes ready to receive either constantly or when a link is not set up between said nodes; and
   at least one second exclusive transceiver for transferring information over at least one of a plurality of transfer channels which are used for the transfer of information;
   information being interchanged between said nodes such that at least one of said nodes which are to hold a communication therebetween searches for and selects an idle channel out of said transfer channels, a packet interchange is effected via said first transceiver between said nodes which are to hold a communication therebetween, during said packet interchange at least one of said nodes delivers a control packet and, immediately following begins to deliver a carrier to said idle channel, a channel for information transfer is assigned by said nodes as a result of said packet interchange over said control channel, and information is transferred to the other node via said second transceiver which is tuned to said channel assigned.

2. A system as claimed in claim 1, wherein a first one of said nodes, if said selected transfer channel is idle, begins to deliver a carrier to said channel and, immediately following, sends to a second one of said nodes a channel assign packet for assigning a channel to be used, and said second node upon reception of said packet sends back an acknowledge packet to said first node.

3. A system as claimed in claim 1, wherein a first one of said nodes sends to a second one of said nodes a channel request packet for requesting assignment of a channel to be used, and said second node upon reception of said packet and if said selected transfer channel is idle begins to deliver a carrier to said channel and, immediately following, sends back a channel assign packet for assigning a channel to be used to said first node.

4. A system as claimed in claim 1, wherein a direction of communication with respect to transmission and reception is changeable on said transfer channel assigned between said nodes.

5. A system as claimed in claim 4, wherein a semi-duplex operation is performed on one of said transfer channels which is assigned.

6. A system as claimed in claim 1, wherein at least one of said nodes delivers a control packet and, at immediately following, begins to deliver a carrier to said idle transfer channel, and said packet interchange is performed twice to assign said transfer channels which are different in the direction of transfer to two of said nodes.

7. A system as claimed in claim 1, wherein a reverse transfer channel assign to a forward transfer channel to which a carrier begins to be delivered simultaneously with the delivery of a control packet is determined beforehand, and, after said forward channel has been assigned by packet interchange, two transfer channels which are different in the direction of transfer are secured between a first and a second ones of said nodes by said forward and reverse channels, whereby a full-duplex link is set up between said first and second nodes.

8. A system as claimed in claim 7, wherein a plurality of transfer channels are provided by frequency multiplexing and arranged such that said forward and reverse transfer channels neighbor each other with respect to frequency.

9. A system as claimed in claim 8, wherein whether or not a carrier is present is determined over a band width which contains transmission bands of said forward and reverse channels, whereby an idle channel is searched for.

10. A system as claimed in claim 1, wherein said transfer channels are grouped into a plurality of channel groups in terms of a service class of information interchanged, and channel assignment is performed by selecting any one of said channel groups.

11. A system as claimed in claim 1, wherein channel assignment is performed by giving priority to said transfer channels with respect to a service class of information interchange.

12. A system as claimed in claim 1, wherein a packet communication of short inquiry data is performed over said control channel before assigning a channel.

13. A system as claimed in claim 1, wherein said control channel is constituted by an exclusive transmission path which is independent of said common transfer path.

14. A system as claimed in claim 1, wherein an access system for packet transfer on said control channel is selected from a group consisting of a CSMA system with collision detection, a CSMA system with immediate acknowledgment, and a token passing system.

15. A multiple access communication system in which a plurality of nodes are interconnected by a common transmission path said common transmission path having a plurality of channels, and said nodes interchange information with each other, comprising:
- a first exclusive transceiver for a control channel which is assigned commonly to said nodes such that said transceiver becomes ready to receive either constantly or when a link is not set up between said nodes; and
- at least one second exclusive transceiver for transferring information over at least one of a plurality of transfer channels which are used for the transfer of information;
- information being interchanged between said nodes such that at least one of said nodes which are to hold a communication therebetween searches for and selects an idle channel out of said transfer channels, a packet interchange is effected via said first transceiver between said nodes which are to hold a communication therebetween, during said packet interchange at least one of said nodes delivers a control packet, and immediately following begins to deliver a carrier to said idle channel, a channel for information transfer is assigned by said nodes as a result of said packet interchange over said control channel, information is transferred to the other node via said second transceiver which is tuned to said channel assigned, and when an unusual condition is detected on said transfer channel assigned an information transfer mode on a link which is associated with said transfer channel is cancelled.

16. A system as claimed in claim 15, wherein a packet for cancelling an information transfer mode on a link which is associated with a node having detected said unusual condition is transmitted.

17. A mutliple access communication system in which a plurality of nodes are interconnected by a common transmission path said common transmission path having a plurality of channels, and said nodes interchange information with each other, comprising:
- a first exclusive transceiver for a control channel which is assigned commonly to said nodes such that said transceiver becomes ready to receive either constantly or when a link is not set up between said nodes; and
- at least one second exclusive transceiver for transferring information over at least one of a plurality of transfer channels which are used for the transfer of information;
- information being interchanged between said nodes such that at least one of said nodes which are to hold a communication therebetween searches for and selects an idle channel out of said transfer channels, a packet interchange is effected via said first transceiver between said nodes which are to hold a communication therebetween, during said packet interchange at least one of said nodes delivers a control packet and immediately following begins to deliver a carrier to said idle channel, a channel for information transfer is assigned by said nodes as a result of said packet interchange over said control channel, information is transferred to the other node via said second transceiver which is tuned to said channel assigned, and an information transfer mode on a link which appears at the end of a communication is cancelled.

18. A multiple access communication system in which a plurality of nodes are interconnected by a common transmission path said common transmission path having a plurality of channels, and said nodes interchange information with each other, comprising:
- a first exclusive transceiver for a control channel which is assigned commonly to said nodes such that said transceiver becomes ready to receive either constantly or when a link is not set up between said nodes; and
- at least one second exclusive transceiver for transferring information over at least one of a plurality of transfer channels which are used for the transfer of information;
- information being interchanged between said nodes such that each of said nodes searches for and selects an idle channel out of said transfer channels, a first one of said nodes begins to deliver a carrier wave to the selected transfer channel if said selected transfer channel is idle and, immediately following, sends to a second one of said nodes a channel assign packet for assigning a channel to be used, and said second node upon reception of said packet begins to deliver a carrier wave to a transfer channel selected if said transfer channel is idle and, immediately following, sends to said first node a channel assign packet for assigning a channel to be used, whereby a duplex link is set up between said first and second nodes by bidirectional transfer channels.

* * * * *